(12) United States Patent
Slaby et al.

(10) Patent No.: US 8,139,353 B2
(45) Date of Patent: Mar. 20, 2012

(54) MODULAR UNIVERSAL PARTS AND PERSONALITY PARTS OF A DOCKING SYSTEM

(75) Inventors: Jiri Slaby, Buffalo Grove, IL (US); Roger W. Ady, Chicago, IL (US); Paul M. Pierce, Grayslake, IL (US); Karl R. Voss, Schaumburg, IL (US); Charles B. Woodhull, Sturtevant, WI (US)

(73) Assignee: Motorola Mobility, Inc., Libertyville, IL (US)

(*) Notice: Subject to any disclaimer, the term of this patent is extended or adjusted under 35 U.S.C. 154(b) by 145 days.

(21) Appl. No.: 12/609,864

(22) Filed: Oct. 30, 2009

(65) Prior Publication Data

US 2011/0103002 A1    May 5, 2011

(51) Int. Cl.
*G06F 1/16* (2006.01)
(52) U.S. Cl. ............... 361/679.41; 439/488; 435/320.1; 455/550.1; 312/196
(58) Field of Classification Search ............... 439/173, 439/350, 578, 625, 488, 63, 710; 435/379, 435/285.1, 91.2, 124, 91.41, 320.1; 455/66.1, 455/41.2, 550.1, 575.1, 774.1, 73; 312/223.3, 312/249.9, 107.5, 196; 345/175, 179
See application file for complete search history.

(56) References Cited

U.S. PATENT DOCUMENTS

| | | | |
|---|---|---|---|
| 5,280,229 A | | 1/1994 | Faude et al. |
| 5,742,149 A | | 4/1998 | Simpson |
| 6,994,575 B1 * | | 2/2006 | Clark et al. ............ 439/173 |
| 7,352,567 B2 | | 4/2008 | Hotelling et al. |
| 7,480,138 B2 * | | 1/2009 | Kogan et al. ............ 361/679.02 |
| 7,719,830 B2 * | | 5/2010 | Howarth et al. ......... 361/679.41 |
| 2006/0250764 A1 | | 11/2006 | Howarth et al. |
| 2007/0174490 A1 | | 7/2007 | Choi et al. |
| 2008/0140868 A1 | | 6/2008 | Kalayjian et al. |
| 2008/0280268 A1 | | 11/2008 | Kelley et al. |
| 2010/0227493 A1 * | | 9/2010 | Guy et al. .................. 439/345 |

FOREIGN PATENT DOCUMENTS

| | | |
|---|---|---|
| EP | 1613073 A1 | 1/2006 |
| GB | 2451943 A | 2/2009 |
| WO | 2006077453 A1 | 7/2006 |

OTHER PUBLICATIONS

Apple Universal Dock, 2009, pp. 1-80, www.apple.com/support.
Icy Dock, "MB881US-1S" EZ-Dock eSATA & USB SATA HDD Docking Station, Jun. 12, 2009, 1 page, http://www.icydock.com/product/images/mb881_kit.jpg.

* cited by examiner

*Primary Examiner* — Hung Duong (57) ABSTRACT

The disclosed docking systems for an electronic device may provide any accessory function and may include more than one connector such as a battery charger connector, a USB hub, a memory card hub, an audio boom box connector, and the like. A modular universal part is configured with at least a one connector that is configured to interface with an electronic device connector. A personality part, specific to the electronic device, is configured to receive both the electronic device and the modular universal part so that the modular universal part connector is capable of interfacing with the electronic device connector. In this way, the personality part can align the electronic device connectors with any number of modular universal part connectors. In this way, an accessory part including a modular universal part could be reuseable with different electronic devices since the personality part is specific to the electronic device.

20 Claims, 11 Drawing Sheets

MODULAR UNIVERSAL PARTS AND PERSONALITY PARTS OF A DOCKING SYSTEM

FIELD

Disclosed are modular universal parts and personality parts of a docking system for an electronic device, and more particularly, docking systems that according to their configurations, provides for modularity and reuseablity.

BACKGROUND

The makers of mobile communication devices, including those of cellular telephones and other portable electronic devices are increasingly adding functionality to their devices. For example, cellular telephones include features such as still and video cameras, video streaming and two-way video calling, email functionality, Internet browsers, music players, television reception, FM radios with stereo audio and organizers. Bluetooth enabled cellular telephones may be PC compatible so that files generated or captured on the mobile communication device may be downloaded to a PC. Likewise, data from a PC or other source may be uploaded to the mobile communication device. Cellular telephones in particular are becoming more than simply mobile communication devices. They are evolving into powerful tools for information management and entertainment.

Docking stations of various types may allow a user to better utilize the functions of their device. For example, as a music player, a mobile communication device may include a connector, such as μUSB, HDMI, head set jack, and other similar connector, which can connect to an accessory such as a larger set of powered speakers to deliver louder sound from the device. For Internet browsing, a mobile communication device may include a connector, such as a μUSB, HDMI, head set jack, and other similar connectors, which can connect to an accessory such as a larger display screen that can deliver PC sized display output from the device. Docking stations may also provide accessories such as auxiliary power and/or battery charging.

DETAILED DESCRIPTION

Typically, different electronic device designs include different types of connectors that are positioned at different locations on the different devices. A docking station, or a set of docking stations for different functions, specific to a device, may become obsolete when the device is no longer utilized since the connectors locations, and possibly some of their types, are not the same as most other devices. It would be beneficial if an accessory part that provides accessory functionality for one or more functions of an electronic device could be reuseable with different electronic devices.

A docking station that provides the functionality of an accessory may be bulky and thus expensive to ship. It also would be beneficial if a docking station could be collapsible so that an accessory for an electronic device could be shipped for less in less expensive flat packing Disclosed are docking systems for an electronic device, the electronic device including at least one electronic device connector. An electronic device may include more than one connector such as a μUSB, HDMI, head set jack, and other similar connectors. A modular universal part is configured with at least a one connector that is configured to interface with an electronic device connector. A modular universal part may be a connection pass-through, but may also be modular universal parts that serve as a battery charger, a USB hub, a memory card hub, an, audio part, an audio boom box connector, and the like. A personality part is configured to receive both the electronic device and the modular universal part so that the modular universal part connector is capable of interfacing with the electronic device connector. The personality part can be specific to the electronic device. In this way, the personality part can align the electronic device connectors with any number of modular universal part connectors.

The personality part may be made with no electronics. The personality part may include one or more apertures through which the modular universal part connector is capable of interfacing with the electronic device connector. On the other hand, the personality part may include electronics so that the modular universal part connector is capable of interfacing with the electronic device connector by way of the electronics of the personality part, or the modular universal part may include connection to interface with the electronics of the personality part. In addition, the personality part may include additional enhancements, features or components, such as an acoustic chamber or labyrinth to adjust frequency response. Either way, an accessory part including a modular universal part that provides accessory functionality for one or more functions of an electronic device could be reuseable with different electronic devices since the personality part is specific to the electronic device.

In one embodiment, the modular part and the universal part may be assembled so that when the modular universal part is received by the personality part, the modular universal part, from at least one viewing angle, is obscured by the personality part. In another embodiment, the modular part and the universal part may be assembled so that when the modular universal part is received by the personality part, the modular universal part and the personality part together rest on the same plane. In another embodiment, the modular part and the universal part may be assembled so that when the modular universal part is received by the personality part, the modular universal part and the personality part together form an orthogonal configuration. Since the modular universal part and the personality part may be assembled and disassembled, the disclosed docking system is collapsible so that an accessory for an electronic device could be shipped for less in less expensive flat packing.

A user of an electronic device may utilize different functions of their device in different locations. Since certain of the connectors of the electronic device may be more likely utilized in different situations, such as in a car, in an office, or in a family room, the disclosed docking systems may include an identifier so that the electronic device may automatically initiate a particular function utilized in that location. In another embodiment, the device may initiate a query to the user regarding a particular function utilized in that location. In another embodiment, an identifier may be configured to provide at least one type of information to the electronic device regarding a function of a modular universal part received by the personality part. In another embodiment, an identifier may be configured to provide at least one type of information to the electronic device regarding a user desired function utilized in that location even though the same connector is utilized at multiple locations. This may be an important function of situational awareness as will be described in more detail below.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

Figures 1A, 1B, 1C:
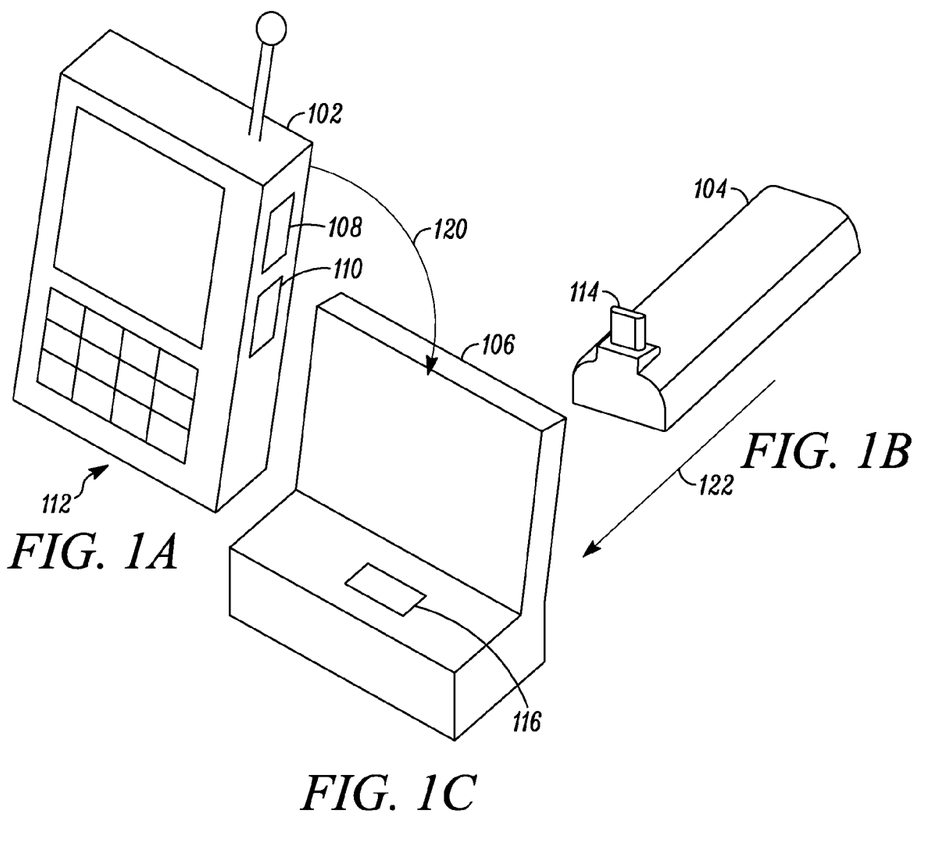
FIGS. 1A, 1B and 1C depict an embodiment of a docking system including an electronic device, a modular universal part and a personality part.

FIGS. 1A, 1B and 1C depict an embodiment of a docking system 100 including an electronic device 102, a modular universal part 104 and a personality part 106. The electronic device 102 includes at least one electronic device connector 108 and/or 110. An electronic device may include more than one connector 108 and/or 110 such as a μUSB, HDMI, head set jack, and other similar connectors. The connector may be located on the electronic device 102 in any suitable location. For example, one or more connectors may be on the bottom portion of the housing 112.

The mobile communication device 102 may be implemented as a cellular telephone (also called a mobile phone), or any type of portable electronics device such as media players, GPS units, and the like. The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, media players, GPS units, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The depicted docking system 100 includes an embodiment of a modular universal part 104 configured with at least a one modular part connector 114 configured to interface with an electronic device connector 108. In this example, the modular part connector may interface with a connector at the bottom portion of the housing 112, through for example an aperture 116 of the personality part 106. In this way, an accessory can be interfaced with the electronic device 102. One or more accessories can be interfaced with the electronic device simultaneously including, for example, a set of speakers, a monitor, a battery charger. Also, the modular universal part may operate as a connection pass-through, and/or may operate as one or more modular universal parts that provides one or more of the following features: battery charging, auxiliary power (such as integrated battery power), USB hub connection, information storage (such as a memory card), media output (such as audio from a speaker), media connection (such as connections to an external audio and/or video output device), and the like.

A personality part 106 is configured to receive the electronic device 102 as depicted by arrow 120. It is understood that the personality part can be configured in any suitable manner. Shown is a personality part 106 having a single aperture 116 to receive the connector 114 of the modular universal part 104. The personality part 106 may include any number or any kind of interface facilitating structures so that it can receive a modular universal part 104, connector 114 and an electronic device connector 108. As shown, the personality part may be made with no electronics. On the other hand, the personality part may include electronics so that the modular universal part connector is capable of interfacing with the electronic device connector by way of the electronics of the personality part 106, or the modular universal part may include connection to interface with the electronics of the personality part. It is understood that the personality part 106 can receive the modular universal part 104 as depicted by arrow 122 or in any other suitable manner.

Figure 2:
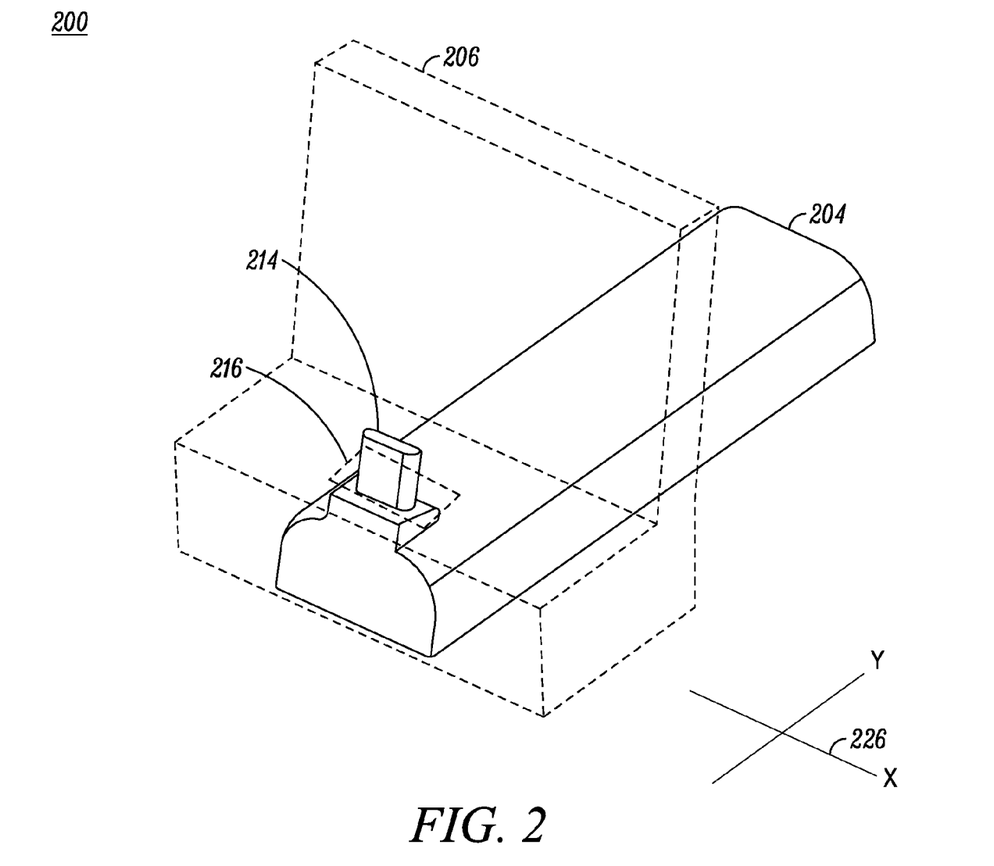
FIG. 2 depicts an embodiment of a personality part that has received a modular universal part connector through the aperture.

FIG. 2 depicts an embodiment of a personality part 206 that has received a modular universal part connector 214 through the aperture 216. In this way, the modular universal part connector 214 can interface with the electronic device connector, in this example, at the bottom portion of the housing 112 (see FIGS. 1A, 1B and 1C), through, for example an aperture 216 of the personality part 206. The depicted embodiment of the configuration of the system 200 shows that the modular universal part 204 and the personality part 206 are configured so that when the modular universal part 204 is received by the personality part 206, the modular universal part 204 and the personality 206 part together rest on the same x-y plane 226.

In the system 200, the personality part 204 can be configured for resting self-support and the modular universal part 204 can be configured to provide further resting support to the personality part 206. On the other hand, the modular universal part 204 can be configured to provide resting support to the personality part 206. It is understood that any other shaped modular universal part 204 that is configured so that the modular universal part 204 and the personality 206 part together rest on the same x-y plane 226, is within the scope of this discussion.

Figure 3:
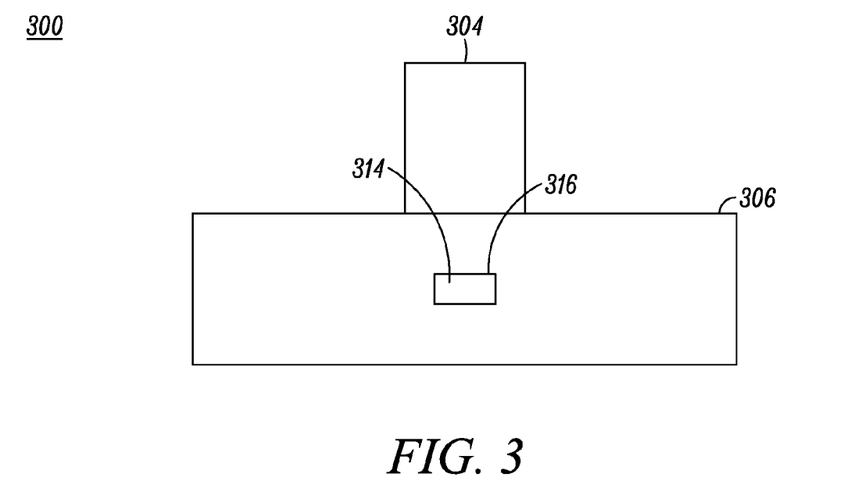
FIG. 3 depicts a top-down view of the embodiment of the system shown in FIG. 2.

FIG. 3 depicts a top-down view of the embodiment of the system 300 shown in FIG. 2, system 200. The depicted embodiment of the configuration of the system 300 shows that the modular universal part 304 and the personality 306 part are configured so that when the modular universal part 304 is received by the personality part 306, the modular universal part 304 and the personality 306 part together form a orthogonal configuration. The electronic connector 314 of the modular universal part 304 is shown positioned within the aperture 316 of the personality part 306. It is understood that any other shaped modular universal part 204 that is configured so that the modular universal part 204 and the personality 206 part together form an orthogonal configuration is within the scope of this discussion.

Figure 4:
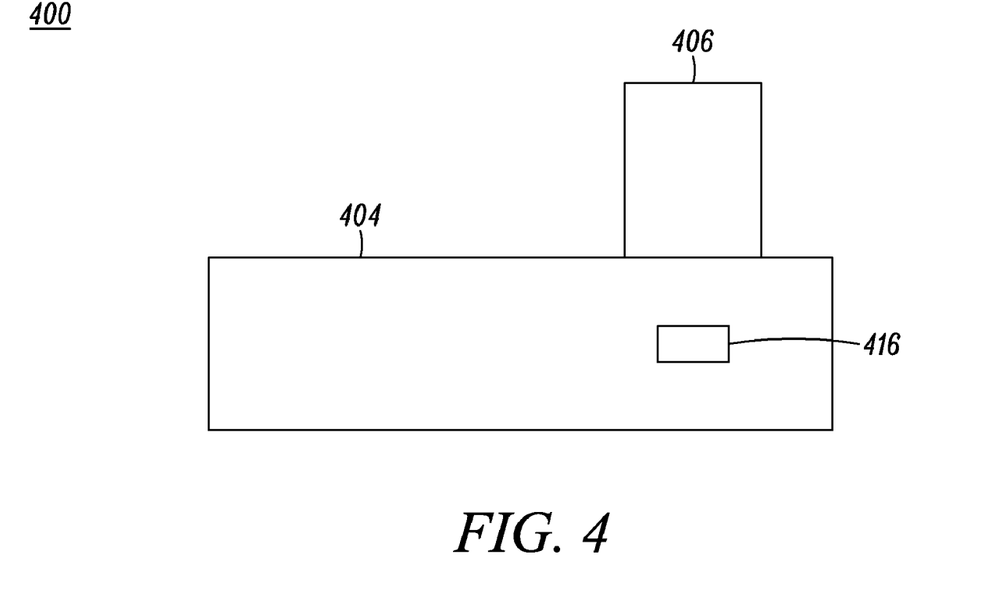
FIG. 4 depicts a top-down view of an embodiment of a system where a modular universal part is positioned to one side of the personality part so that its electronic connector can interface with that of an electronic device.

FIG. 4 depicts a top-down view of an embodiment of a system 400 where a modular universal part 406 is positioned to one side of the personality part 404 so that its electronic connector 416 can interface with that of an electronic device 102 (see FIGS. 1A, 1B and 1C). The configuration has characteristics of an orthogonal configuration.

Figure 5:
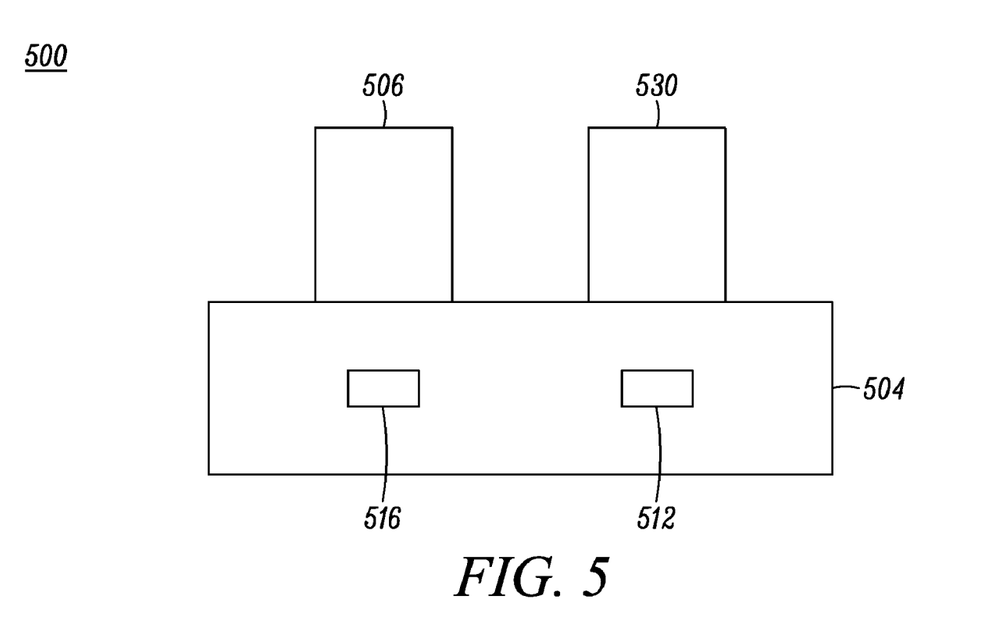
FIG. 5 depicts a top-down view of an embodiment of a system where two modular universal parts are positioned so that their electronic connectors can interface those of an electronic device.

FIG. 5 depicts a top-down view of an embodiment of a system 500 where two modular universal parts 506 and 530 are positioned so that their electronic connectors 516 and 532 can interface those of an electronic device 102 (see FIGS. 1A, 1B and 1C). The configuration 500 has characteristics of an orthogonal configuration.

Figure 6:
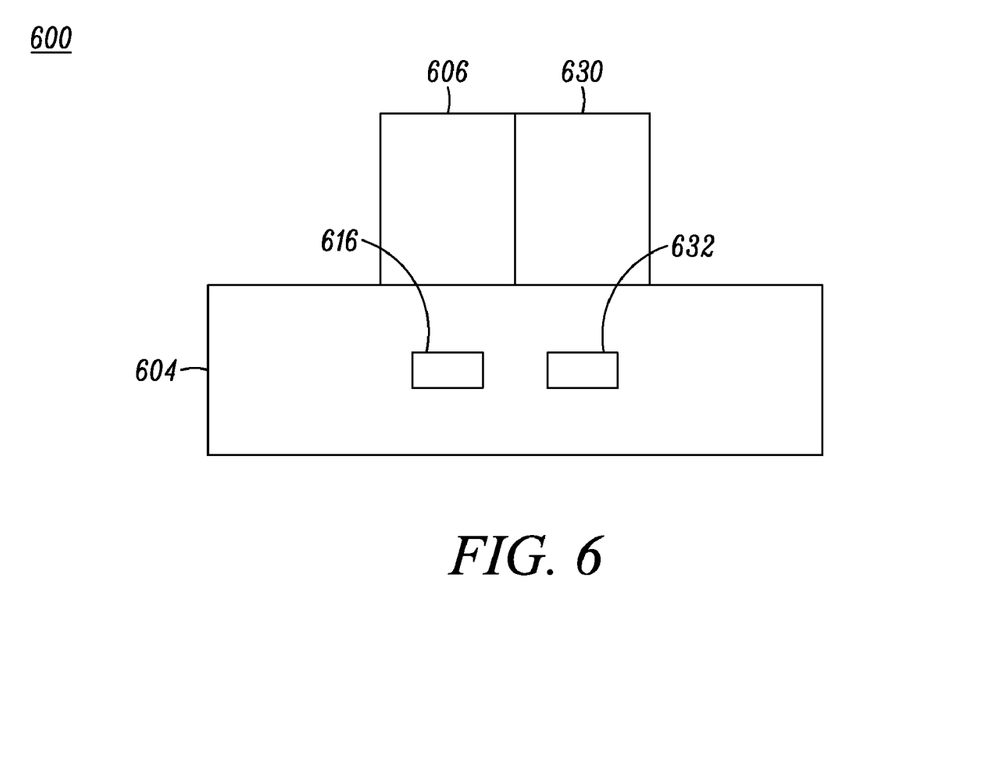
FIG. 6 depicts a top-down view of an embodiment of a system where two modular universal parts are positioned so that their electronic connectors can interface those of an electronic device.

FIG. 6 depicts a top-down view of an embodiment of a system 600 where two modular universal parts 606 and 630 are positioned so that their electronic connectors 616 and 632 can interface those of an electronic device 102 (see FIGS. 1A, 1B and 1C). The configuration 600 has characteristics of an orthogonal configuration.

Figure 7:
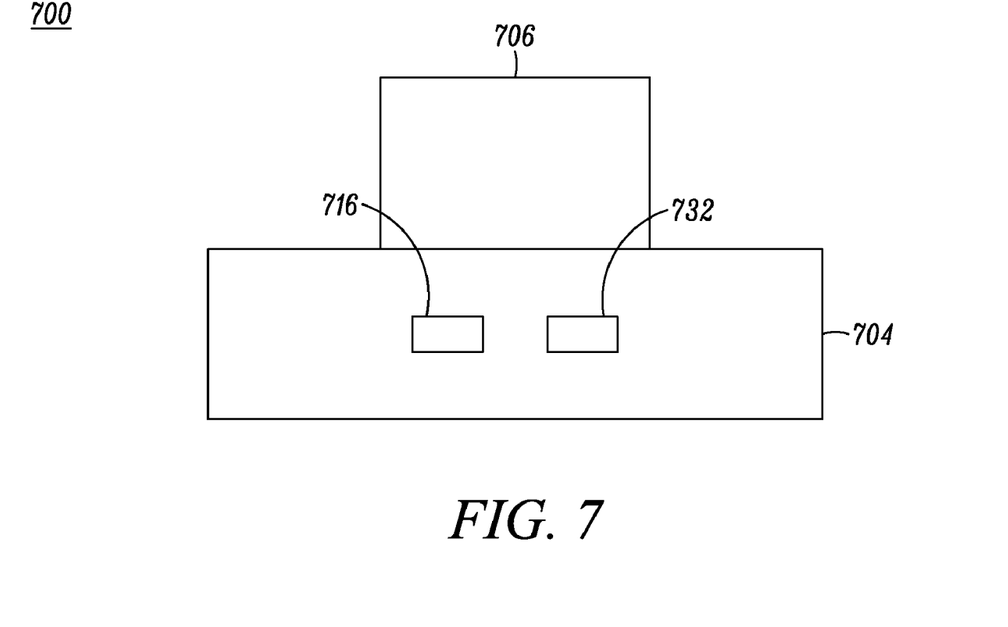
FIG. 7 depicts a top-down view of an embodiment of a system where a modular universal part is positioned so that its electronic connectors can interface with those of an electronic device.

FIG. 7 depicts a top-down view of an embodiment of a system 700 where a modular universal part 706 is positioned so that its electronic connectors 716 and 732 can interface with those of an electronic device 102 (see FIGS. 1A, 1B and 1C). The modular universal part 706 can have two or more functions as could a modular universal part with one connector. The configuration has characteristics of an orthogonal configuration.

Figure 8:
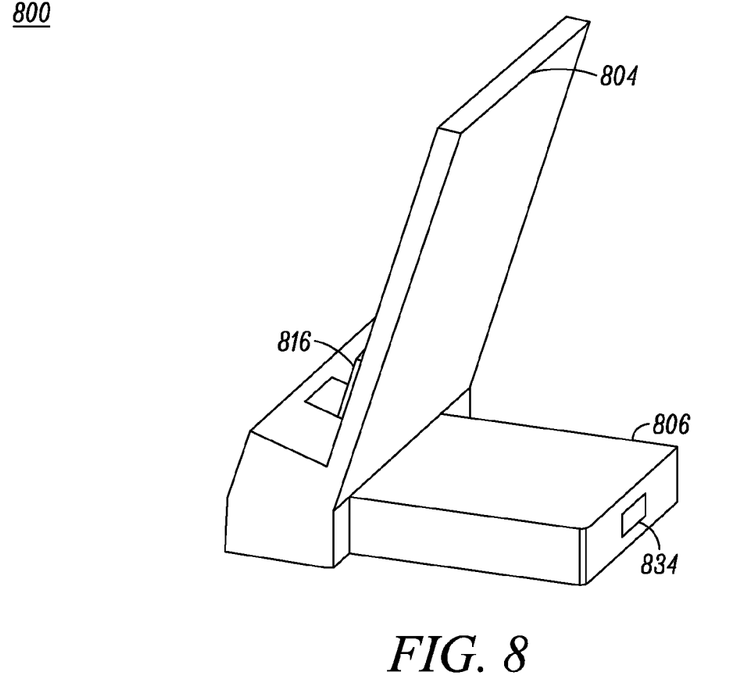
FIG. 8 depicts a side view of an embodiment of a system where a modular universal part is positioned so that its electronic connector can interface with those of an electronic device.

FIG. 8 depicts a side view of an embodiment of a system 800 where a modular universal part 806 is positioned so that its electronic connector 816 can interface with those of an electronic device 102 (see FIGS. 1A, 1B and 1C). The shown connector 834 may be one of any number of configurations. For example, the modular universal part 806 may operate as a bypass for an accessory. In another embodiment the modular universal part 806 is configured to receive a connector from an auxiliary accessory via connector 834. It is understood that a described modular universal part 806 can share data wirelessly and/or via a wired connection.

Figure 9:
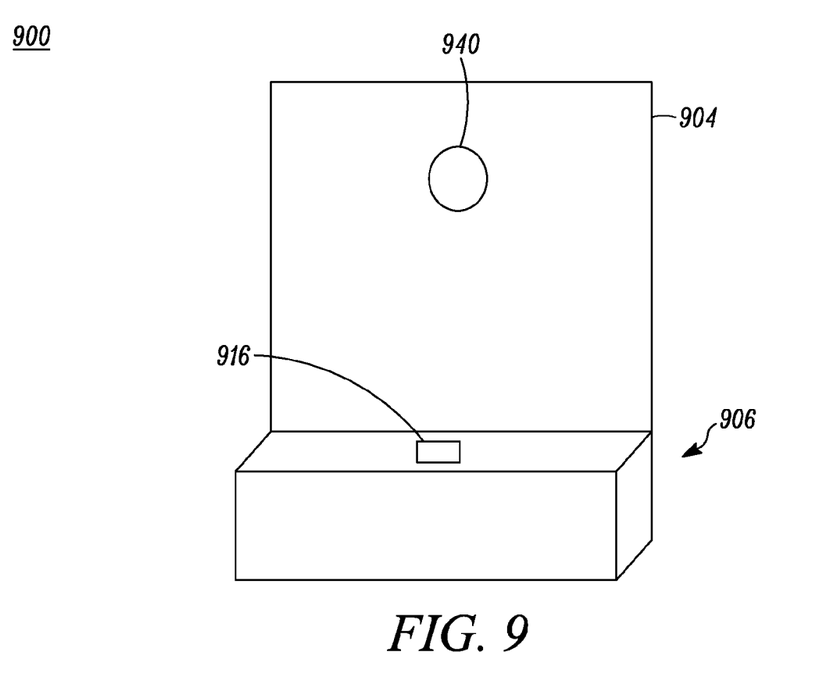
FIG. 9 depicts a front view of an embodiment of a system including a personality part, and a modular universal part behind it.

FIG. 9 depicts a front view of an embodiment of a system 900 including a personality part, and a modular universal part 906 behind it. A connector 916 of the modular universal part 906 is shown. In the depicted embodiment, when the modular universal part 906 is received by the personality part 904, the modular universal part 906, from at least one viewing angle, is obscured by the personality part 904.

Also shown in FIG. 9 is an identifier 940. As mentioned above, a user of an electronic device 102 (see FIGS. 1A, 1B and 1C) may utilize different functions of their device in different locations. Since certain of the connectors of the electronic device may be more likely utilized in different situations, such as in a car, in an office, or in a family room, the disclosed docking systems may include an identifier so that the electronic device may automatically initiate a particular function utilized in that location. In another embodiment, the device may initiate a query to the user regarding a particular function utilized in that location. In another embodiment, an identifier may be configured to provide at least one type of information to the electronic device regarding a function of a modular universal part received by the personality part. In another embodiment, an identifier may be configured to provide at least one type of information to the electronic device regarding a user desired function utilized in that location even though the same connector is utilized at multiple locations.

In one example, the described docking system, in a business office may bring up office email directly. If the user has another docking system in living areas, once the electronic device 102 (see FIGS. 1A, 1B and 1C) is docked, it may bring different applications that a user pre-defines, or that are assigned by default, for instance, movie selections. And similarly for additional docking systems, the user may select, or they may be provided by default, different starting applications. In this way, an identifier may be configured to provide at least one of information to the electronic device regarding a function of the modular universal part received by the personal part, or situational information to allow optimization of the user interface of the electronic device 102 in the docking system 900 to appear.

The personality part 904 can include at least one identifier 940 configured to provide at least one type of information to the electronic device regarding a function of a modular universal part received by the personality part or situational information regarding the situation of the docking system. In the example of FIG. 9, the identifier 940 can be a magnet. A system of magnets that corresponds to different locations is disclosed. One or more magnets can be added to a personality part 904, or removed, so that the electronic device 102 can recognize the situation of the docking station via the polarity of the magnet 940. For example, a magnet with a positive polarity may represent the docking system 900 in a car. A magnet with a negative polarity may represent a docking system 900 on a desk top. Rotation may be achieved via an axis of rotation in a plastic carrier of the magnet or any other suitable matter. It is understood that any other identifier 940 is within the scope of this discussion.

Figure 10:
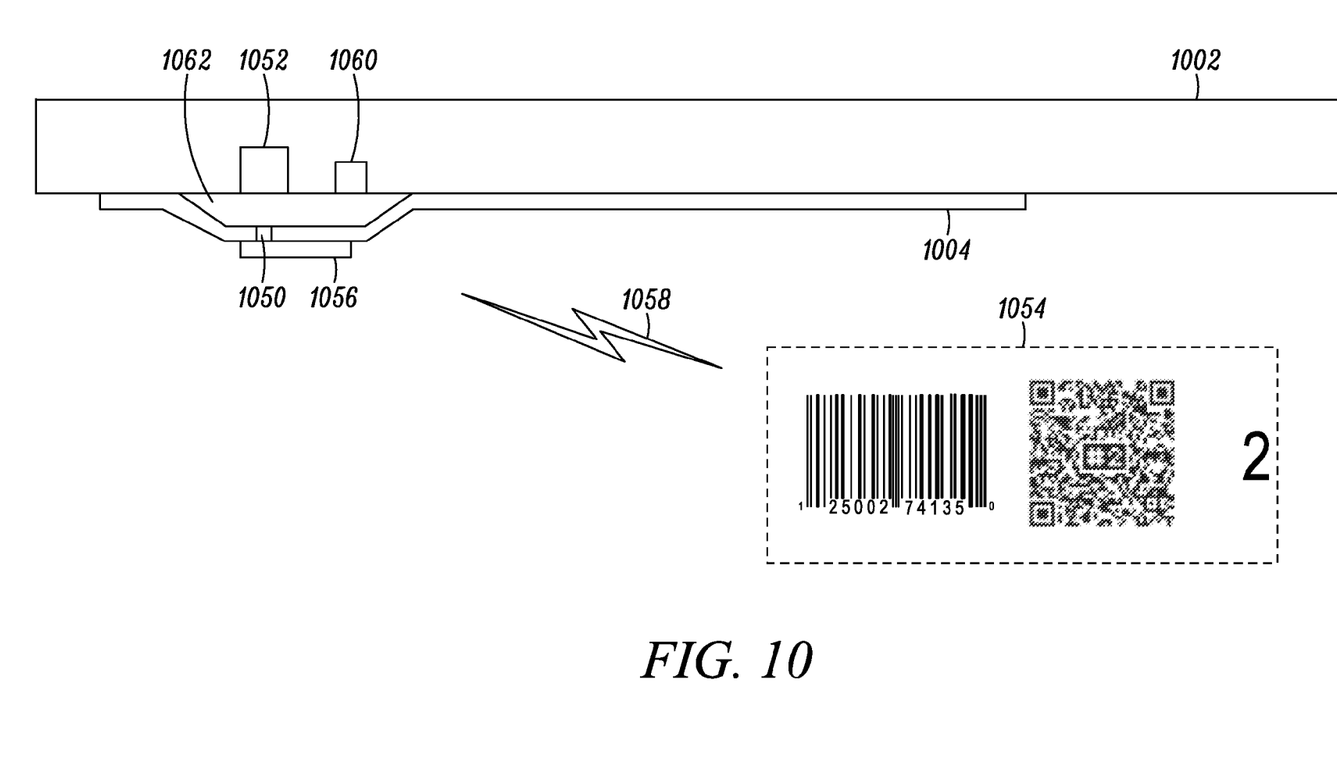
FIG. 10 depicts an electronic device positioned adjacent a portion of a personality part for illustrative purposes to shown an identifier that can detect an unique identifying indicia.

FIG. 10 depicts an electronic device 1002 positioned adjacent a portion of a personality part 1004 for illustrative purposes to show an identifier that can detect an unique identifying indicia 1050. Such unique identifying indicia 1050 can be a slot or deboss or label that varies, for example, with a desktop, car or music docking system, or with desired user interface assigned by user to that particular dock for situational awareness. The unique identifying indicia 1050 can be positioned in any suitable location to be detected by an imager 1052. For example, if identifying indicia 1054 are positioned in a location that is not in direct view of the imager 1052, for example, on the personality part 106 (see FIGS. 1A, 1B and 1C) a light guide 1056 can direct an image 1058 to the imager 1052. If a flash 1060 is included, a plenum 1062 to allow flash illumination can be included.

Figure 11:
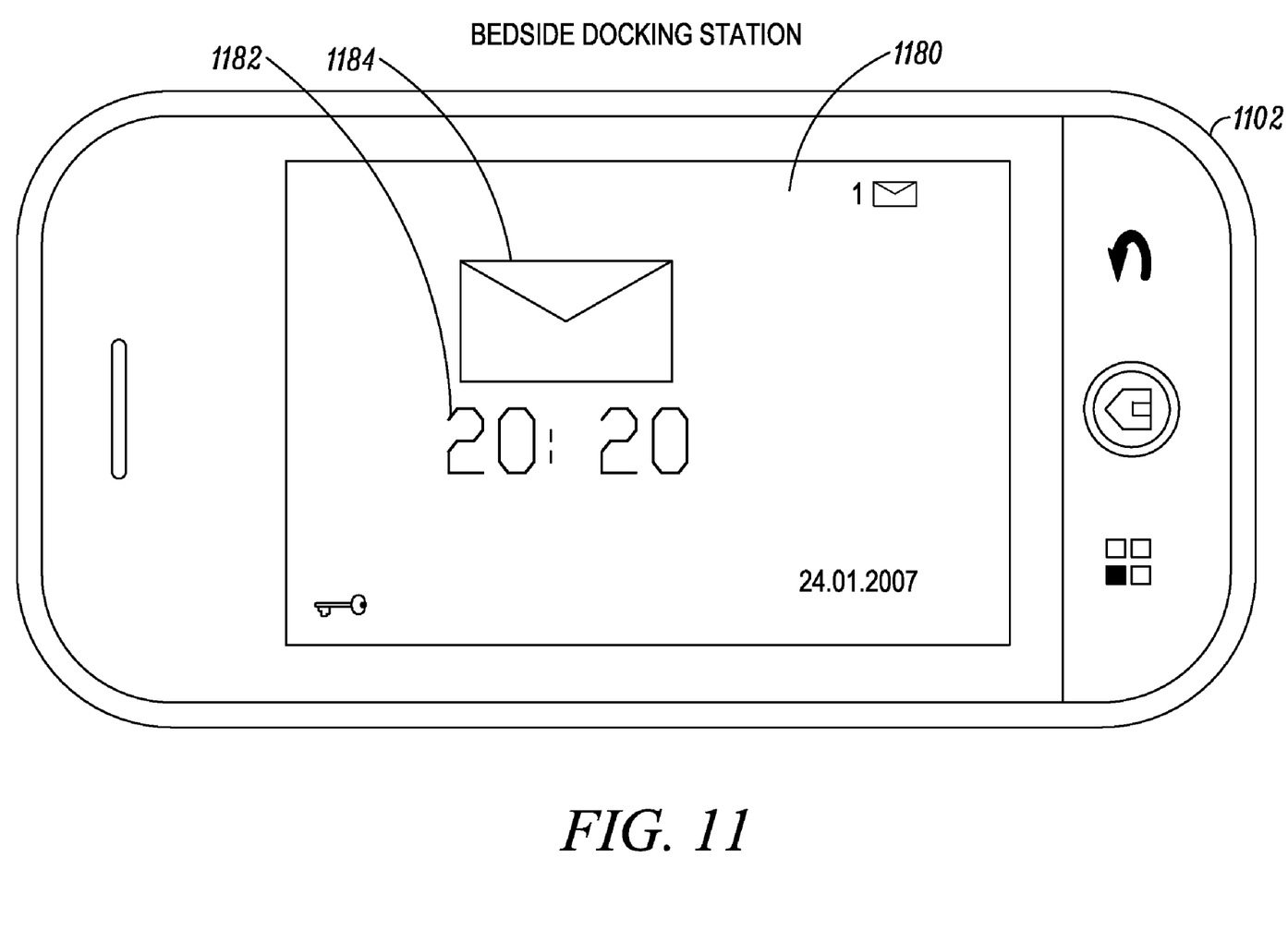
FIG. 11 is an embodiment of an electronic device with a display having visual output representative of its situational awareness that is particular to a docking system.

FIG. 11 is an embodiment of an electronic device 1102 with a display 1180 having visual output representative of its situational awareness that is particular to a docking system. As discussed above, an identifier which can be indicia 1050 (see FIG. 10) of a modular universal part 104 (see FIGS. 1A, 1B and 1C) or a personality part 106 may be detected by the electronic device 1102. In this way, the electronic device 1102 may process its situational awareness. The output on the display 1180 of the electronic device 1102 may particular, for example, to a bedside docking system. Any suitable user interface for that particular docking system with respect to that particular situational awareness is within the scope of this discussion. The clock 1182 may have an alarm set, and the message indicator 1184 may indicate a message while the device is sleep mode.

Figure 12:
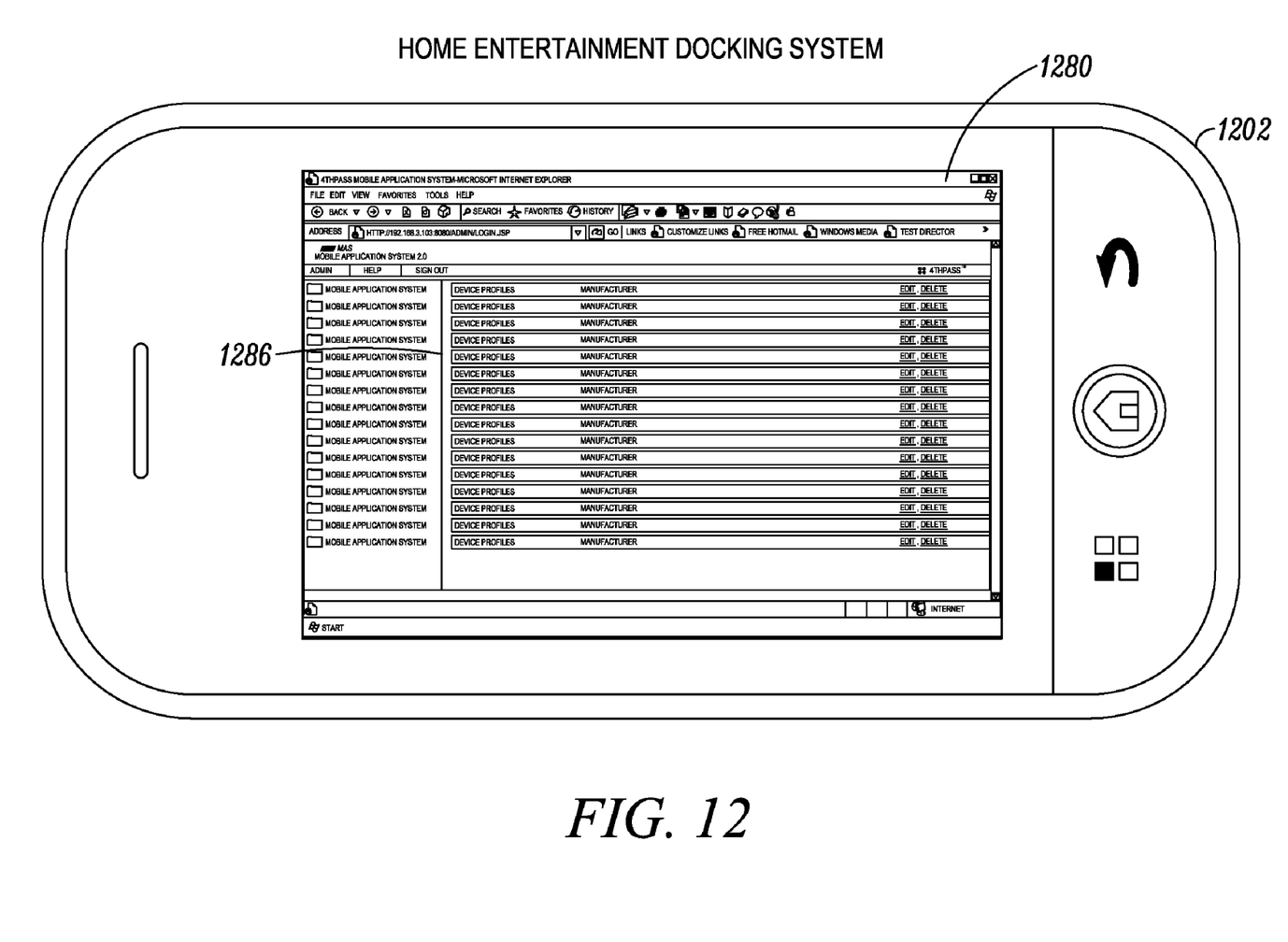
FIG. 12 is an embodiment of an electronic device with a display having visual output representative of its situational awareness that is particular to a docking system.

FIG. 12 is an embodiment of an electronic device 1202 with a display 1280 having visual output representative of its situational awareness that is particular to a docking system. As discussed above, an identifier which can be indicia 1050 (see FIG. 10) of a modular universal part 104 (see FIGS. 1A, 1B and 1C) or a personality part 106 may be detected by the electronic device 1202. In this way, the electronic device 1202 may process its situational awareness. The output on the display 1280 of the electronic device 1202 may particular, for example, to an office docking system. In one embodiment, as soon as the device 1202 is placed in the docking system of an office, an email user interface 1286 may be initiated. In another embodiment, as soon as the device is placed in the docking system of an office, an office menu may be provided, for example, including the selection of accessing email. The output of the display with respect to its situational awareness, or any audio output of the device, may be selected by the user and/or may be provided by default.

Figure 13:
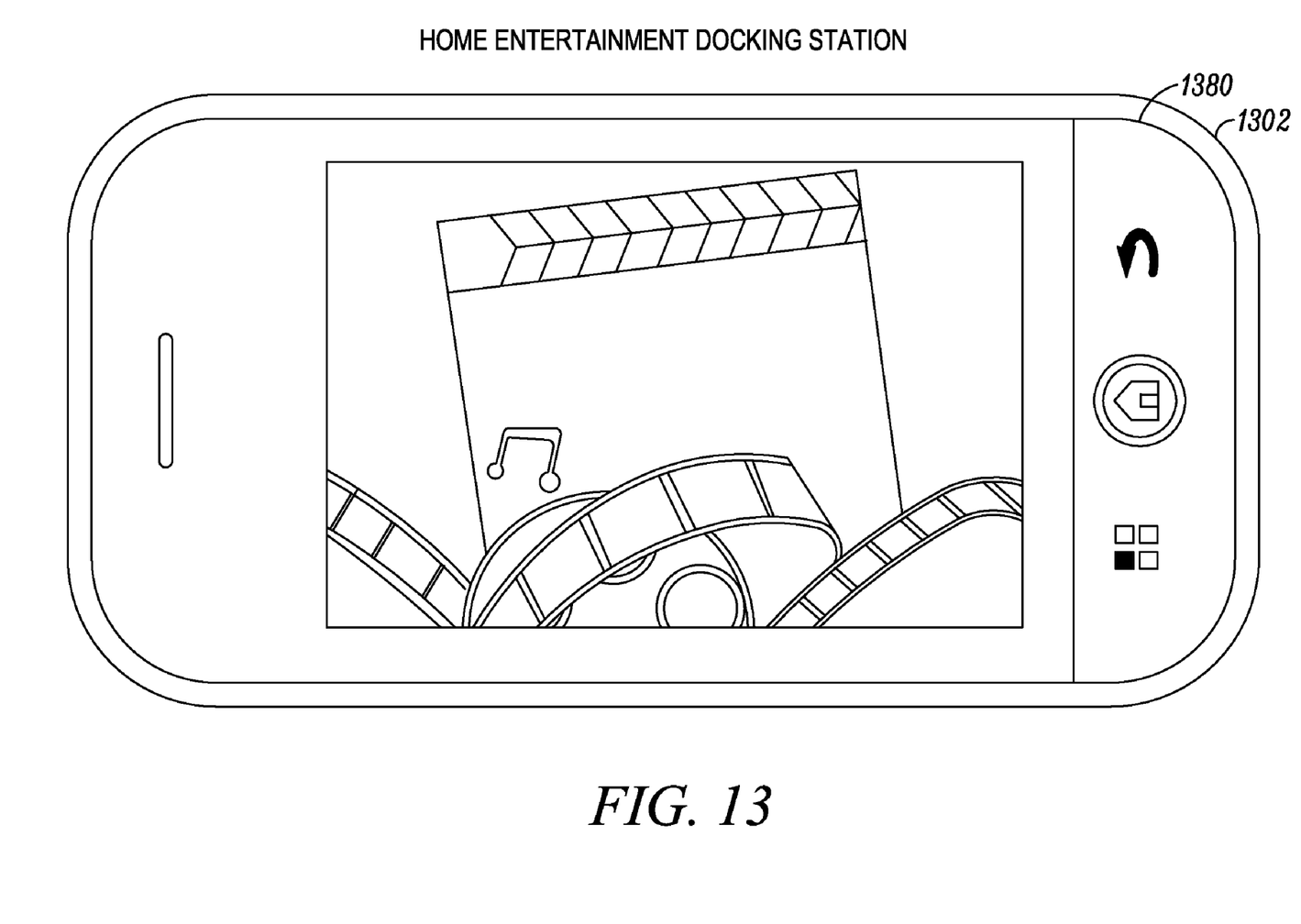
FIG. 13 is an embodiment of an electronic device with a display having visual output representative of its situational awareness that is particular to a docking system.

FIG. 13 is an embodiment of an electronic device 1302 with a display 1380 having visual output representative of its situational awareness that is particular to a docking system. As discussed above, an identifier which can be indicia 1050 (see FIG. 10) of a modular universal part 104 (see FIGS. 1A, 1B and 1C) or a personality part 106 may be detected by the electronic device 1302. In this way, the electronic device 1302 may process its situational awareness. The output on the display 1380 of the electronic device 1302 may particular, for example, to a home entertainment docking system in a user's family room. In yet another embodiment, a menu, for example, including options of a home entertainment docking may be provided on the display 1380 when the device 1302 is docked in a docking system in a user's family room.

Figure 14:
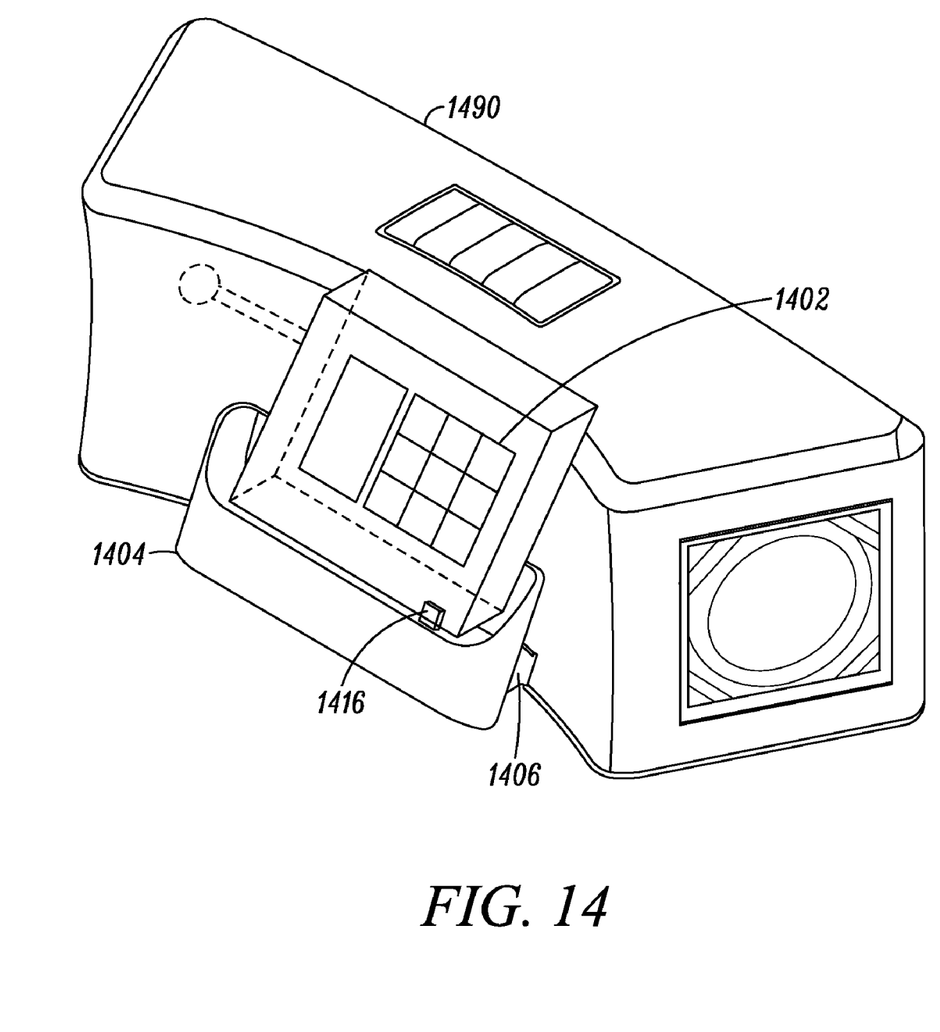
FIG. 14 depicts an embodiment of a docking system for a boom box accessory.

FIG. 14 depicts an embodiment of a modular universal part 1406, a boom box accessory 1490 and a personality part 1404 with the electronic connector 1416 of the modular universal part 1406. A boom box accessory 1490 can cooperate and/or may be incorporated with the modular universal part 1406. As shown, the electronic device 1402 may be positioned horizontally on or within the personality part as well as vertically.

It is understood that the personality part 1404 can accommodate a particular electronic device 1402 in any suitable manner.

Figure 15:
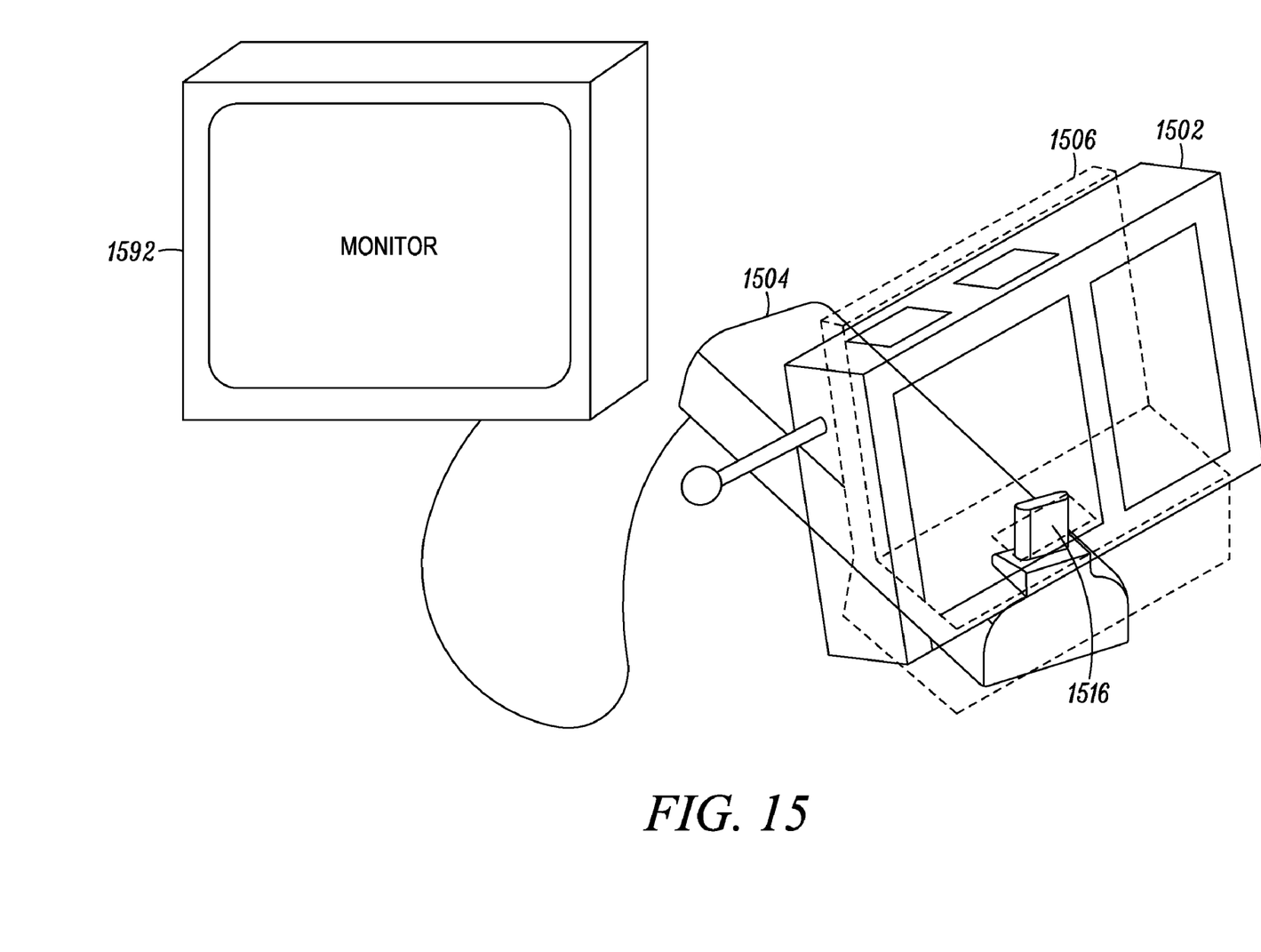
FIG. 15 depicts an embodiment of a docking system for a monitor accessory modular universal part.

FIG. 15 depicts an embodiment of a modular universal part 1504, a monitor accessory 1592 and a personality part 1506 with the electronic connector 1516 of the modular universal part 1504. A monitor accessory 1592 can cooperate and/or may be incorporated with the modular universal part 1504. As shown, the electronic device 1502 may be positioned horizontally on or within the personality part as well as vertically.

The disclosed docking systems for an electronic device may provide any accessory function and may include more than one connector such as a battery charger connector, a USB hub, a memory card hub, an audio boom box connector, and the like. A modular universal part is configured with at least a one connector that is configured to interface with an electronic device connector. A personality part is configured to receive both the electronic device and the modular universal part so that the modular universal part connector is capable of interfacing with the electronic device connector. The personality part can be specific to the electronic device. In this way, the personality part can align the electronic device connectors with any number of modular universal part connectors. In this way, an accessory part including a modular universal part could be reuseable with different electronic devices since the personality part is specific to the electronic device. Since the modular universal part and the personality part may be assembled and disassembled, the disclosed docking system is collapsible so that an accessory for an electronic device could be shipped for less in less expensive flat packing.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A docking system for an electronic device, the electronic device including at least one electronic device connector, comprising:
    a modular universal part configured with at least a one modular part connector configured to interface with an electronic device connector;
    a personality part configured to receive the electronic device, to receive the modular universal part and to receive at least one modular universal part connector so that a modular universal part connector is capable of interfacing with the electronic device connector; and
    wherein when the modular universal part is received by the personality part, the modular universal part, from at least one viewing angle, is obscured by the personality part.

2. The system of claim 1 wherein the modular universal part and the personality part are configured so that when the modular universal part is received by the personality part, the modular universal part and the personality part together rest on the same plane.

3. The system of claim 1 wherein the modular universal part and the personality part are configured so that when the modular universal part is received by the personality part, the modular universal part and the personality part together form an orthogonal configuration.

4. The system of claim 1 wherein personality part is configured for resting self-support and the modular universal part is configured to provide further resting support to the personality part.

5. The system of claim 1 wherein the modular universal part is configured to provide resting support to the personality part.

6. The system of claim 1 wherein the modular universal part is configured to receive a connector from an auxiliary accessory.

7. The system of claim 1 wherein the personality part comprises:
    at least one identifier configured to provide at least one type of information to the electronic device regarding a function of a modular universal part received by the personality part or situational information regarding the situation of the docking system.

8. The system of claim 7 wherein the identifier is at least one of a magnet or a code.

9. A docking system for an electronic device, the electronic device including at least one electronic device connector, comprising:
    a modular universal part configured with at least a one modular part connector configured to interface with an electronic device connector;
    a personality part configured to receive the electronic device, to receive the modular universal part and to receive at least one modular universal part connector so that a modular universal part connector is capable of interfacing with the electronic device connector; and
    wherein the modular universal part and the personality part are configured so that when the modular universal part is received by the personality part, the modular universal part and the personality part together rest on the same plane.

10. The system of claim 9 wherein when the modular universal part is received by the personality part, the modular universal part, from at least one viewing angle, is obscured by the personality part.

11. The system of claim 9 wherein personality part is configured for resting self-support and the modular universal part is configured to provide further resting support to the personality part.

12. The system of claim 9 wherein the modular universal part is configured to provide resting support to the personality part.

13. The system of claim 9 wherein the modular universal part is configured to receive a connector from an auxiliary accessory.

14. The system of claim 9 wherein the personality part comprises:
    at least one identifier configured to provide at least one of information to the electronic device regarding a function of the modular universal part received by the personality part or situational information regarding the situation of the docking system.

15. A docking system for an electronic device, the electronic device including at least one electronic device connector, comprising:
    a modular universal part configured with at least a one modular part connector configured to interface with an electronic device connector;
    a personality part configured to receive the electronic device, to receive the modular universal part and to receive at least one modular universal part connector so that a modular universal part connector is capable of interfacing with the electronic device connector; and
    wherein the modular universal part and the personality part are configured so that when the modular universal part is received by the personality part, the modular universal part and the personality part together form an orthogonal configuration.

16. The system of claim 15 wherein when the modular universal part is received by the personality part, the modular universal part, from at least one viewing angle, is obscured by the personality part.

17. The system of claim 15 wherein personality part is configured for resting self-support and the modular universal part is configured to provide further resting support to the personality part.

18. The system of claim 15 wherein the modular universal part is configured to provide resting support to the personality part.

19. The system of claim 15 wherein the modular universal part is configured to receive a connector from an auxiliary accessory.

20. The system of claim 15 wherein the personality part comprises:
    at least one identifier configured to provide at least one of information to the electronic device regarding a function of the modular universal part received by the personality part or situational information regarding the situation of the docking system.

* * * * *